(12) United States Patent
Lin et al.

(10) Patent No.: US 11,431,799 B2
(45) Date of Patent: Aug. 30, 2022

(54) METHOD, ELECTRONIC DEVICE AND COMPUTER PROGRAM PRODUCT FOR STORING AND ACCESSING DATA

(71) Applicant: EMC IP Holding Company LLC, Hopkinton, MA (US)

(72) Inventors: Zhenzhen Lin, Shanghai (CN); Pengfei Wu, Shanghai (CN); Si Chen, Shanghai (CN); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 16/806,550

(22) Filed: Mar. 2, 2020

(65) Prior Publication Data
US 2021/0168207 A1    Jun. 3, 2021

(30) Foreign Application Priority Data

Nov. 29, 2019   (CN) .......................... 201911206453.9

(51) Int. Cl.
*H04L 29/08* (2006.01)
*H04L 67/1097* (2022.01)
(Continued)

(52) U.S. Cl.
CPC ...... *H04L 67/1097* (2013.01); *H04L 67/1023* (2013.01); *H04L 67/561* (2022.05); *H04L 67/01* (2022.05)

(58) Field of Classification Search
CPC ............. H04L 67/1097; H04L 67/1023; H04L 67/2804; H04L 67/42; H04L 67/10
See application file for complete search history.

(56) References Cited

U.S. PATENT DOCUMENTS

| 7,818,402 | B1 * | 10/2010 | Zhang | ................... | H04L 67/108 |
| | | | | | 709/219 |
| 2010/0094921 | A1 * | 4/2010 | Roy | ........................ | G06F 15/16 |
| | | | | | 709/201 |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

(Continued)

*Primary Examiner* — Gil H. Lee
*Assistant Examiner* — Juan C Turriate Gastulo
(74) *Attorney, Agent, or Firm* — Ryan, Mason & Lewis, LLP (57) ABSTRACT

Embodiments of the present disclosure relate to a method, an electronic device and computer program product for storing and accessing data. The method comprises: in accordance with a determination that first data is stored in a first edge server of a plurality of edge servers, generating, at a second edge server of the plurality of edge servers, first metadata associated with the first data, and the first metadata at least comprises a first hash value of the first data and an indication that the first data is stored in the first edge server; and sending the first metadata to a management server of the plurality of edge servers, the management server being configured to maintain a metadata list associated with data stored in the plurality of edge servers. With this method, the problem that the stored data cannot be accessed due to the edge server being offline can be solved.

20 Claims, 9 Drawing Sheets

(51) Int. Cl.
    *H04L 67/1023*      (2022.01)
    *H04L 67/561*      (2022.01)
    *H04L 67/01*      (2022.01)

(56) References Cited

U.S. PATENT DOCUMENTS

| | | | |
|---|---|---|---|
| 2010/0146053 A1* | 6/2010 | Jiang | H04L 61/2564 |
| | | | 709/204 |
| 2014/0074663 A1* | 3/2014 | Alsina | G06Q 30/0601 |
| | | | 705/27.1 |
| 2016/0301751 A1* | 10/2016 | Peelen | H04L 67/1097 |
| 2017/0272100 A1* | 9/2017 | Yanovsky | G06F 3/0619 |
| 2019/0163372 A1* | 5/2019 | Sridharan | G06F 3/067 |
| 2020/0012619 A1* | 1/2020 | Gupta | G06F 16/9027 |
| 2020/0036789 A1* | 1/2020 | Mehta | G06F 11/1453 |
| 2020/0301883 A1* | 9/2020 | Kamiya | G06F 16/144 |

OTHER PUBLICATIONS

U.S. Appl. No. 16/795,766 filed in the name of Ruixue Zhang et al., filed Feb. 20, 2020, and entitled "Methods, Devices and Computer Program Products for Storing and Accessing Data."

U.S. Appl. No. 16/804,175 filed in the name of Pengfei Wu et al., filed Feb. 28, 2020, and entitled "Method, Device, and Product for Managing Application Nodes in a Distributed Application System."

* cited by examiner

METHOD, ELECTRONIC DEVICE AND COMPUTER PROGRAM PRODUCT FOR STORING AND ACCESSING DATA

RELATED APPLICATION(S)

The present application claims priority to Chinese Patent Application No. 201911206453.9, filed Nov. 29, 2019, and entitled "Method, Electronic Device and Computer Program Product for Storing and Accessing Data," which is incorporated by reference herein in its entirety.

FIELD

Embodiments of the present disclosure generally relate to the field of computers, and more specifically to a method, an electronic device and a computer program product for storing and accessing data.

BACKGROUND

Currently, with the change of business and application requirements, customers often need to store data in different cloud storage devices. Since different cloud providers usually provide different storage interfaces, customers need to interact with different storage interfaces. This will bring an additional operational burden on the customers, which is not expected by storage server providers.

SUMMARY

Embodiments of the present disclosure provide a solution for storing and accessing data.

In a first aspect of the present disclosure, there is provided a method of storing data. The method comprises: in accordance with a determination that first data is stored in a first edge server of a plurality of edge servers, at a second edge server of the plurality of edge servers, generating first metadata associated with the first data, the first metadata at least comprising a first hash value of the first data and an indication that the first data is stored in the first edge server; and sending the first metadata to a management server of the plurality of edge servers, the management server being configured to maintain a metadata list associated with data stored in the plurality of edge servers.

In a second aspect of the present disclosure, there is provided a method of storing data. The method comprises, receiving, at a management server, first metadata from a second edge server of a plurality of edge servers, the first metadata being associated with first data stored in a first edge server of the plurality of edge servers and being generated by the second edge server, the first metadata at least comprising a first hash value of the first data and an indication that the first data is stored in the first edge server; and updating, based on the first metadata, a metadata list associated with data stored in the plurality of edge servers.

In a third aspect of the present disclosure, there is provided a method of accessing data.

The method comprises: in response to receiving, at a third edge server of a plurality of edge servers, an access request for target data, determining, based on a hash value of the target data, whether metadata corresponding to the target data is present in the plurality of edge servers; in response to determining that the metadata is absent from the plurality of edge servers, sending, based on the hash value and to a management server, a query request to determine a fourth edge server of the plurality of edge servers that stores the target data; and causing the fourth edge server to provide the target data as a response to the access request.

In a fourth aspect of the present disclosure, there is provided a method of accessing data. The method comprises: in response to receiving, at the management server, a query request from a third edge server of a plurality of edge servers, determining a fourth edge server for storing target data by using a metadata list associated with data stored in the plurality of edge servers; the query request being generated based on a hash value of the metadata and being sent in accordance with a determination that metadata corresponding to the target data is absent from the plurality of edge servers; and sending, to the third edge server, a response to the query request to indicate that the target data is stored in the fourth edge server.

In a fifth aspect of the present disclosure, there is provided an edge server. The edge server comprises at least one processing unit; at least one memory coupled to the at least one processing unit and storing instructions for execution by the at least one processing unit, the instructions, when executed by the at least one processing unit, causing the edge server to perform the steps of the method according to the first aspect of the present disclosure.

In a sixth aspect of the present disclosure, there is provided a management server. The management server comprises at least one processing unit; at least one memory coupled to the at least one processing unit and storing instructions for execution by the at least one processing unit, the instructions, when executed by the at least one processing unit, causing the management server to perform the steps of the method according to the second aspect of the present disclosure.

In a seventh aspect of the present disclosure, there is provided an edge server. The edge server comprises at least one processing unit; at least one memory coupled to the at least one processing unit and storing instructions for execution by the at least one processing unit, the instructions, when executed by the at least one processing unit, causing the edge server to perform the steps of the method according to the third aspect of the present disclosure.

In an eighth aspect of the present disclosure, there is provided a management server. The management server comprises at least one processing unit; at least one memory coupled to the at least one processing unit and storing instructions for execution by the at least one processing unit, the instructions, when executed by the at least one processing unit, causing the management server to perform the steps of the method according to the fourth aspect of the present disclosure.

In a ninth aspect of the present disclosure, there is provided a computer program product being tangibly stored on a non-transitory computer-readable medium and comprising machine-executable instructions which, when executed by a device, cause the device to perform the method according to the first aspect of the present disclosure.

In a tenth aspect of the present disclosure, there is provided a computer program product being tangibly stored on a non-transitory computer-readable medium and comprising machine-executable instructions which, when executed by a device, cause the device to perform the method according to the second aspect of the present disclosure.

In an eleventh aspect of the present disclosure, there is provided a computer program product being tangibly stored on a non-transitory computer-readable medium and comprising machine-executable instructions which, when executed by a device, cause the device to perform the method according to the third aspect of the present disclosure.

In a twelfth aspect of the present disclosure, there is provided a computer program product being tangibly stored on a non-transitory computer-readable medium and comprising machine-executable instructions which, when executed by a device, cause the device to perform the method according to the fourth aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION

Illustrative embodiments of the present disclosure will be described in more detail below with reference to the drawings. Although the drawings illustrate example embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second," and so on can refer to same or different objects. The following text also can include other explicit and implicit definitions.

As described above, with the change of business and application requirements, customers often need to store data in different cloud storage devices. Since different cloud providers usually provide different storage interfaces, customers need to interact with different storage interfaces, which will be cumbersome and time consuming. In this situation, it is desirable to provide a unified object storage architecture for multi-cloud environments.

The unified storage architecture and the decentralized storage architecture are two widely used storage architectures and each one is adopted by a large number of customers. In a unified object storage architecture, all clients communicate with a centralized storage device to implement data storage and data access. In the decentralized storage architecture, all clients are considered as symmetric peers and data is stored in these decentralized peers. Compared with the unified object storage architecture, the decentralized storage architecture can achieve higher throughput. However, both the customers using the unified storage architectures and the customers using the decentralized storage architectures are looking for ways to migrate the systems to a unified object storage architecture.

Figure 1:
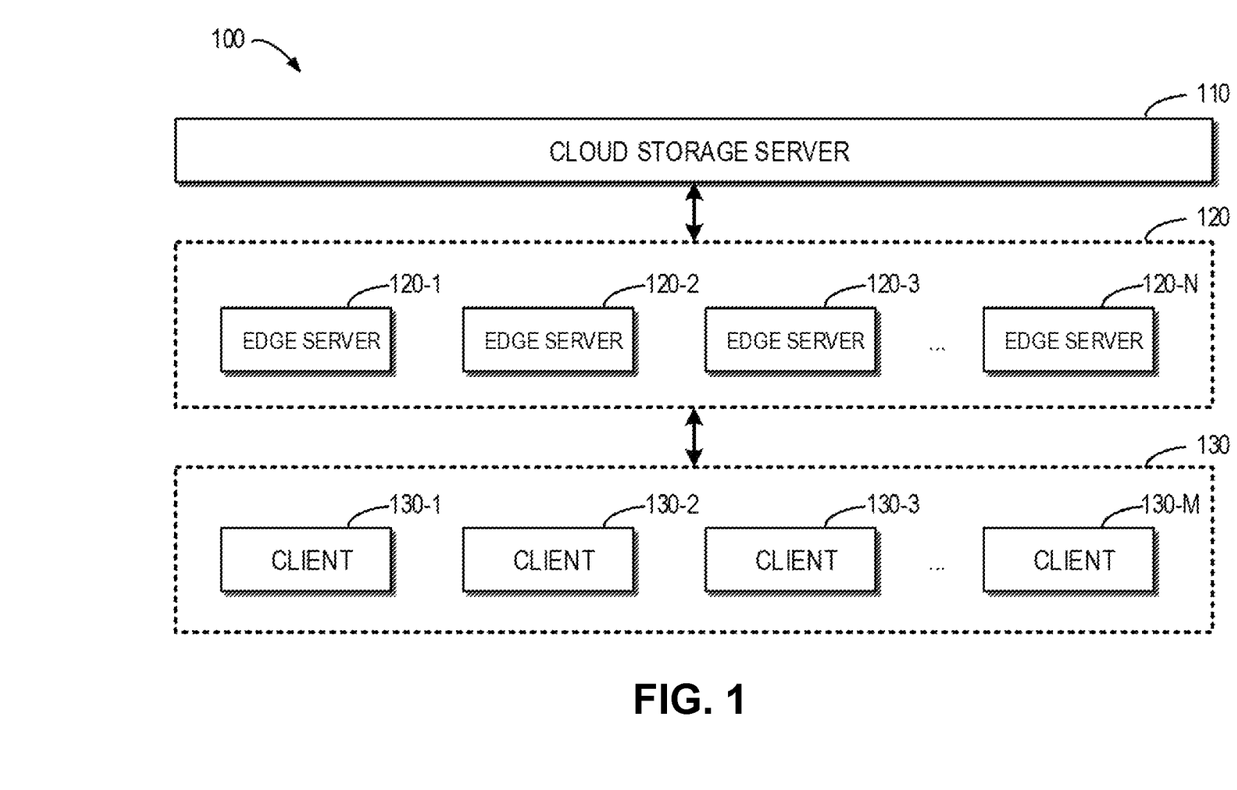
FIG. 1 illustrates a block diagram of an example storage system according to a conventional solution.

In some conventional solutions, a decentralized unified object storage architecture is adopted to build a unified object storage system for multi-cloud environments. FIG. 1 illustrates a diagram of an example storage system 100 according to a conventional solution.

As shown in FIG. 1, the storage system 100 may include a cloud storage server 110, a plurality of edge servers 120-1, 120-2, 120-3, . . . 120-N (hereinafter collectively or individually referred to as "edge server 120") and a plurality of client devices 130-1, 130-2, 130-3, . . . 130-M (hereinafter collectively or individually referred to as "client 130"). For example, the plurality of clients 130 may be communicatively coupled to each other via a network. The plurality of edge servers 120 may be communicatively coupled to each other via a network, for example. In addition, the plurality of clients 130 may communicate with the plurality of servers 120 via a network. In some embodiments, each client 130 may store data into the cloud storage server 110 or the edge server 120 via one or more edge servers 120, and may obtain data from the cloud storage server 110 or the edge server 120 via the one or more edge servers 120 for access.

Generally, each of the plurality of edge servers 120 will maintain metadata corresponding to a portion of the data stored in the plurality of edge servers 120. For example, the plurality of edge servers 120 may maintain corresponding metadata according to a distributed hash table. In this case, the metadata corresponding to the data stored in the edge server 120-1 may be stored in one or more other edge servers.

However, in some scenarios, some edge servers may be offline for some reason, which makes it impossible to obtain the metadata stored in the edge servers. This in turn makes it impossible to access the data corresponding to the metadata, although the corresponding data is stored in a currently accessible edge server. Such problems often occur in scenarios such as autonomous driving, in which edge servers often change, which seriously affects the accessibility of data.

A solution for storing and accessing data according to embodiments of the present disclosure is proposed. This solution implements a decentralized unified object storage architecture to solve one or more of the above and other potential problems. This solution is able to be easily integrated with existing storage architectures. With this solution, the problems caused by the edge server being offline can be solved by maintaining the metadata corresponding to the data stored in the edge server in the management server, thereby improving the reliability of data storage.

Figure 2:
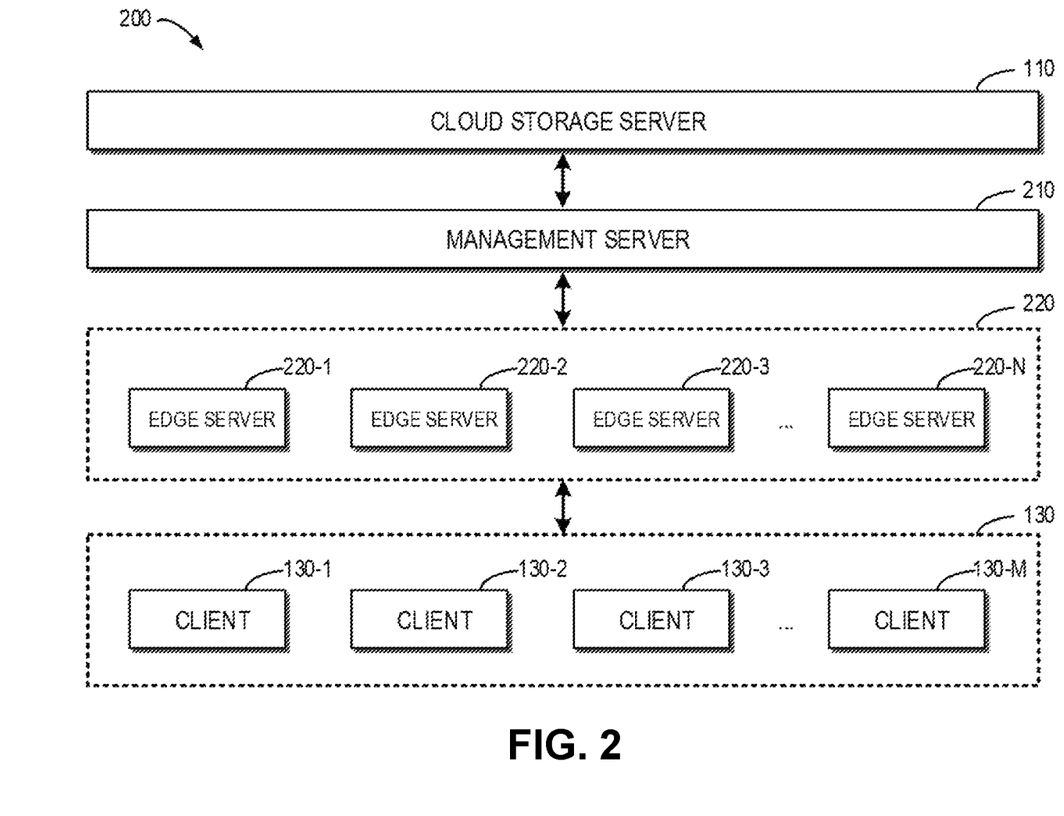
FIG. 2 illustrates a block diagram of an example storage system in which embodiments of the present disclosure can be implemented.

Hereinafter, embodiments of the present disclosure will be described in detail with reference to the accompanying drawings. FIG. 2 illustrates a block diagram of an example storage system 200 in which embodiments of the present disclosure can be implemented. It should be understood that the structure of the storage system 200 is described only for the purpose of illustration, without suggesting any limitation to the scope of the present disclosure.

As shown in FIG. 2, the storage system 200 includes a cloud storage server 110 and a client 130 similar to the conventional storage system 100. The storage system 200 further includes a plurality of edge servers 220-1, 220-2, 220-3, . . . 220-N (hereinafter collectively or individually referred to as "edge server 220") and a management server 210. In some embodiments, the edge server 220 is configured to receive a storage request from the client 130 and to synchronize the created metadata to the management server 210. In some embodiments, for security considerations, the management server 210 may be provided in a non-publicly accessible private network and configured to maintain a metadata list associated with the data stored in the plurality of edge servers 220.

Figure 3:
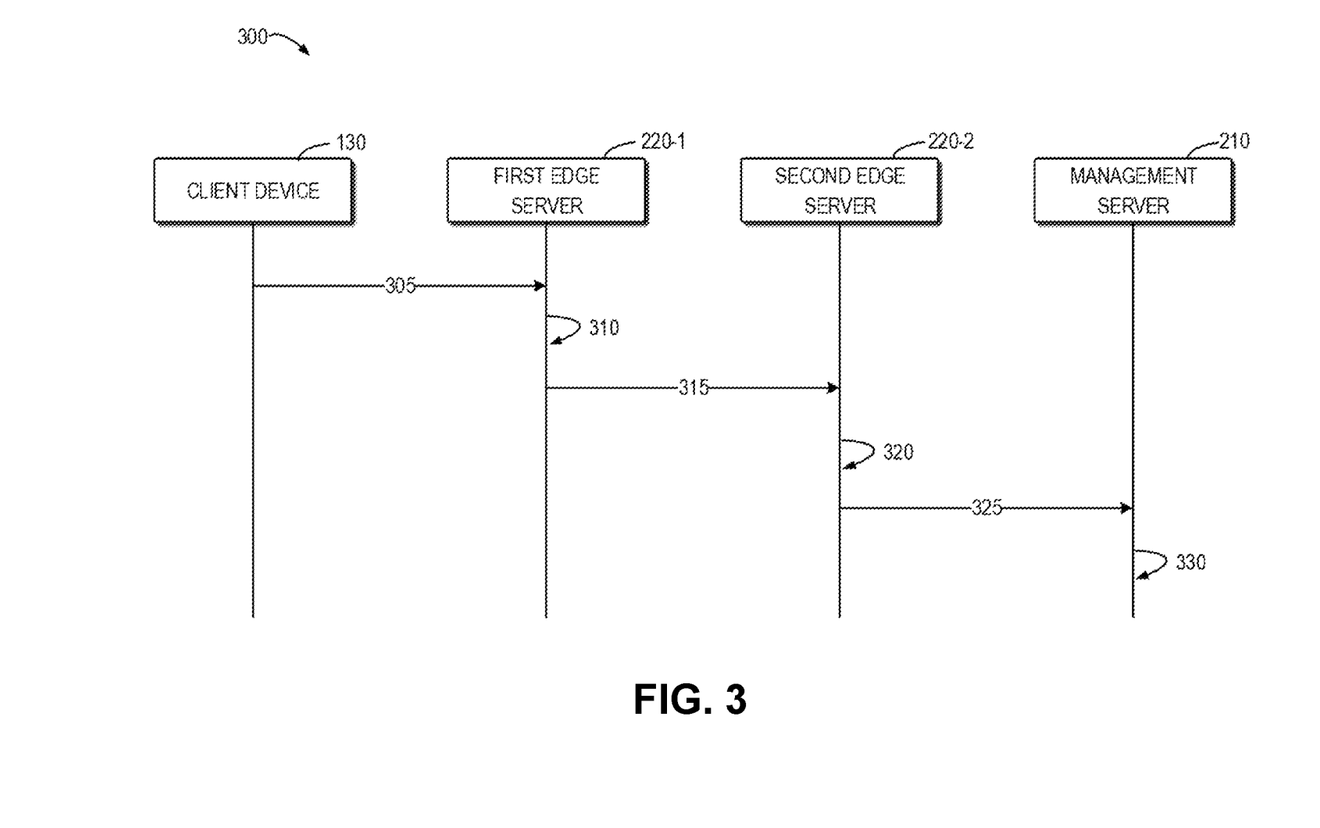
FIG. 3 illustrates a schematic diagram of an example process of storing data according to an embodiment of the present disclosure.

The process of storing data according to an embodiment of the present disclosure will be described below with reference to FIG. 3. FIG. 3 illustrates a schematic diagram 300 of an example process of storing data according to an embodiment of the present disclosure.

As shown in FIG. 3, at 305, the client device 130 sends a request for storing the first data to an edge server (for example, the edge server 220-1 in FIG. 2 (hereinafter referred to as the first edge server)) of the plurality of edge servers 220. At 310, in response to receiving the request, the first edge server 220-1 stores the first data in the first edge server 220-1.

In some embodiments, the first edge server 220-1 may determine a storage rule for storing the first data. Specifically, the first edge server 220-1 determines, for example, a tag corresponding to the storage rule based on the request. In some embodiments, the tag may be identified by, for example, a numeric value or a character, such as "REP-3" or "SYNC-CLOUD."

In some embodiments, the management server 210 may maintain a storage rule list. For example, the storage rule list may include a specific storage rule corresponding to each tag. For example, the storage rule list may store an entry indicating that the storage rule corresponding to "REP-3" is to copy data into 3 backups and store the copies, or indicating that the rule corresponding to "SYNC-CLOUD" is to synchronize data to a cloud storage server.

In some embodiments, for example, when the first edge server 220-1 determines, based on the tag and from the management server 210, that the storage rule of the first data is "synchronize data to the cloud storage server," then the first edge server 220-1 will send the first data to the cloud storage server 110. After receiving the first data from the first edge server 220-1, the cloud storage server 110 will store the first data in the cloud storage server 110.

In some embodiments, the plurality of edge servers 220 maintains the metadata of the data stored in the plurality of edge servers 220 through a distributed hash table. For example, the metadata may be indicated by way of a key-value entry, where the key field may indicate the hash value of the data and the value field may indicate the storage location of the data and/or the latest update time of the data, etc. Based on this method, in response to the first data being written into the first edge server 220-1, the first edge server 220-1 may calculate the hash value of the first data and determine that the metadata corresponding to the hash value should be written into the edge servers of the plurality of edge servers 220. For example, the first edge server 220-1 may determine that metadata of the first data should be written into the second edge server 220-2.

At 315, the first edge server 220-1 may send a message to the second edge server 220-2 to indicate that the first data is stored in the first edge server 220-1. At 320, in response to receiving the message from the first edge server 220-1, the second edge server 220-2 may create the first metadata. The first metadata at least includes a hash value of the first data and an indication that the first data is stored in the first edge server 220-1. In some embodiments, the second edge server 220-2 may determine the hash value from the message sent by the first edge server 220-1 and store the identity of the first edge server 220-1 as the indication that the first data is stored in the first edge server 220-1. In some embodiments, the identity, for example, the network address of the first edge server, may be used to uniquely determine the first edge server 220-1.

At 325, the second edge server 220-2 sends the first metadata to the management server 210. In some embodiments, the second edge server 220-2 may send the first metadata to the management server 210 after each review of the first metadata.

In some embodiments, the second edge server 220-2 may also periodically upload metadata to the management server 210 in batches. Specifically, the second edge server 220-2 may maintain a set of metadata corresponding to at least a part of the data stored in the plurality of edge servers 220. The set of metadata includes first metadata and each metadata in the set of metadata may include a time at which the metadata was recently updated and a time at which the metadata was recently synchronized to the management server 210. For the newly created first metadata, the time when the metadata was recently updated may be recorded as creation time, and then time at which the metadata was recently synchronized to the management server 210 may be recorded as null.

In some embodiments, the second edge server 220-2 may periodically traverse a local set of metadata and determine a subset of metadata from the local set of metadata. The metadata in the subset of metadata has not been sent to the management server 210 after it was recently updated or created. The second edge server 220-2 may send a subset of metadata to the management server 210 in batches for backup. In this way, the communication overhead between the edge server 220 and the management server 210 can be reduced, thereby improving the efficiency of metadata management.

At 330, in response to receiving the first metadata from the second edge server 220-2, the management server 210 updates, based on the first metadata, a metadata list associated with data stored in the plurality of edge servers 220. For example, the management server 210 may add the first metadata to the metadata list. Based on this approach, a backup of the metadata of the data stored in the plurality of edge servers 220 may be maintained in the management server 210, such that the metadata can be accessed by means of the backup metadata in the management server 210 if one of the plurality of edge servers 220 is offline and the metadata is inaccessible, thereby the reliability of data storage is improved.

In some embodiments, as discussed above, the first edge server 220-1 may write the first data to the cloud storage server 110 based on storage rules. The cloud storage server 110 will send the second metadata to the management server 210 accordingly. The second metadata may at least include the first hash value of the first data and an indication that the first data is stored in the cloud storage server 110. For example, the indication may include a network address of the cloud storage server 110.

In some embodiments, the management server 210 may also be used to store data. For example, when the client device 130 requests to store the second data in the management server 210, where the management server 210 is provided in a non-publicly accessible private network or other private implementation, the management server 210 may store the second data locally and add the third metadata to the metadata list. The third metadata may at least include the second hash value of the second data and an indication that the second data is stored in the management server 210. For example, the indication may include a network address of the management server 210.

In the manner described above, data may be stored to at least one of the edge server 220, the management server 210, or the cloud storage server 110, and metadata of data at different storage locations can be uniformly managed in the management server 210. By maintaining the metadata of the data in the more secure management server 210, the reliability of data storage can be improved.

Figure 4:
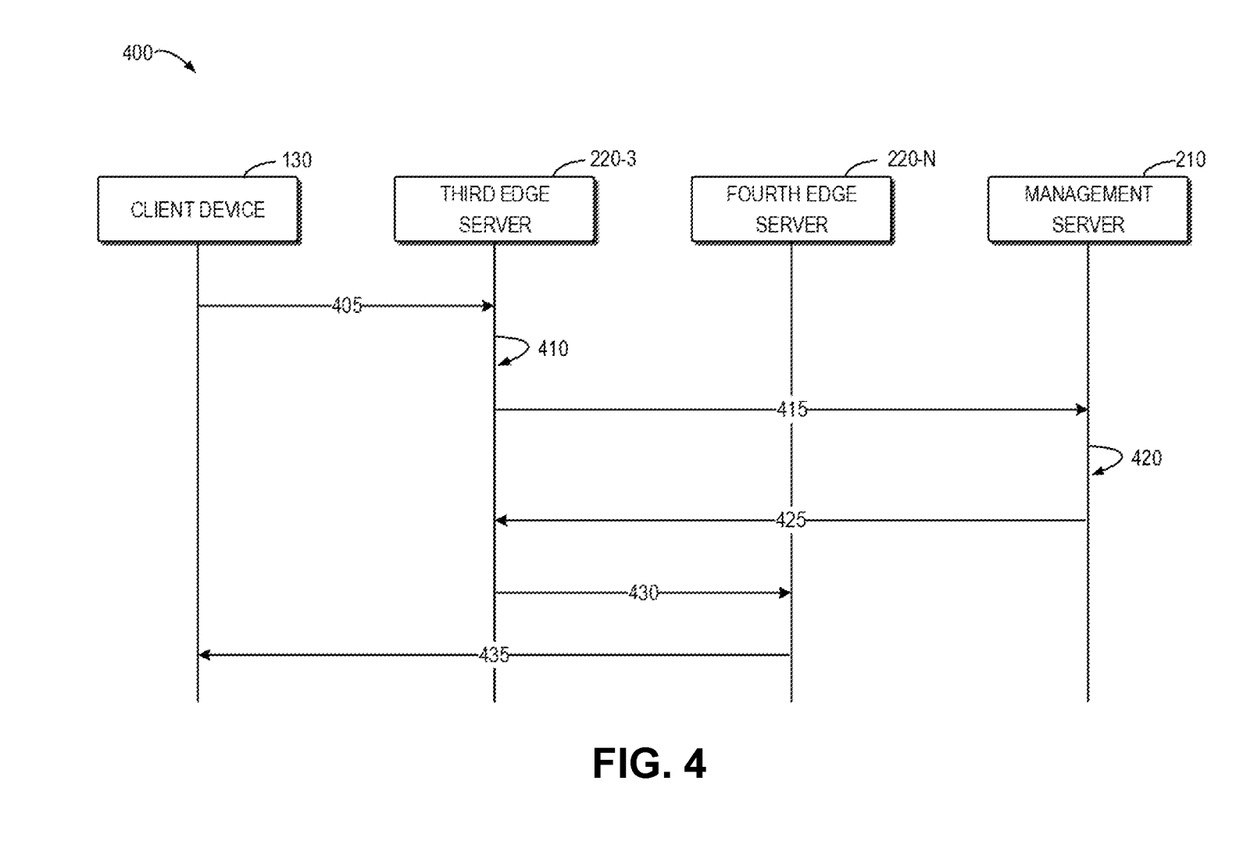
FIG. 4 illustrates a schematic diagram of an example process of accessing data according to an embodiment of the present disclosure.

The process of storing data according to an embodiment of the present disclosure will be described below with reference to FIG. 4. FIG. 4 illustrates a schematic diagram 400 of an example process of accessing data according to an embodiment of the present disclosure.

At 405, the client device 130 sends an access request for target data to an edge server in the plurality of edge servers 220 (for example, the edge server 220-3 in FIG. 2 (hereinafter referred to as a third edge server)). For the purpose of illustration, the process in FIG. 4 will be described below using the first data discussed in conjunction with FIG. 3 as the target data. At 410, based on the hash value of the target data, the third edge server 220-3 determines whether the metadata corresponding to the target data is present in the edge server 220. For example, when the second edge server 220-2 for storing metadata of the first data is offline, the third edge server 220-3 may determine that the metadata corresponding to the first data is absent from the plurality of edge servers 220.

At 415, when it is determined that the metadata corresponding to the target data is absent from the plurality of edge servers 220, based on the hash value, the third edge server 220-3 generates and sends a query request to the management server 210 to determine the storage location of the target data. At 420, upon receiving a query request from the third edge server 220-3, the management server 210 determines the storage location of the target data using the managed metadata list. Specifically, taking the first data as an example of the target data, the management server 210 may query the metadata list based on the hash value of the first data, and then obtain the identity (e.g., a network address) of the fourth edge server 220-N that stores the first data (in this example, it is the first edge server 220-1).

At 425, the management server 210 sends a response to the query request to the third edge server 220-3 to indicate that the target data is stored in the fourth edge server 220-N. Continuing with the example of the first data, the management server 210 may, for example, send the network address of the edge server 220-1 to the third edge server 220-3 to indicate that the first data is stored in the edge server 220-1.

At 430, in response to determining that the target data is stored in the fourth edge server 220-N, the third edge server 220-3 may forward the data access request to the fourth edge server 220-N. At 435, based on the access request, the fourth edge server 220-N may provide the target data to the client device 130.

Based on this method, when an edge server of a plurality of edge servers is offline, according to the embodiments of the present disclosure, the location at which the target data is stored is determined by backing up the metadata in the management server, such that an effective data access can be performed. This further improves the stability of data access.

Figure 5:
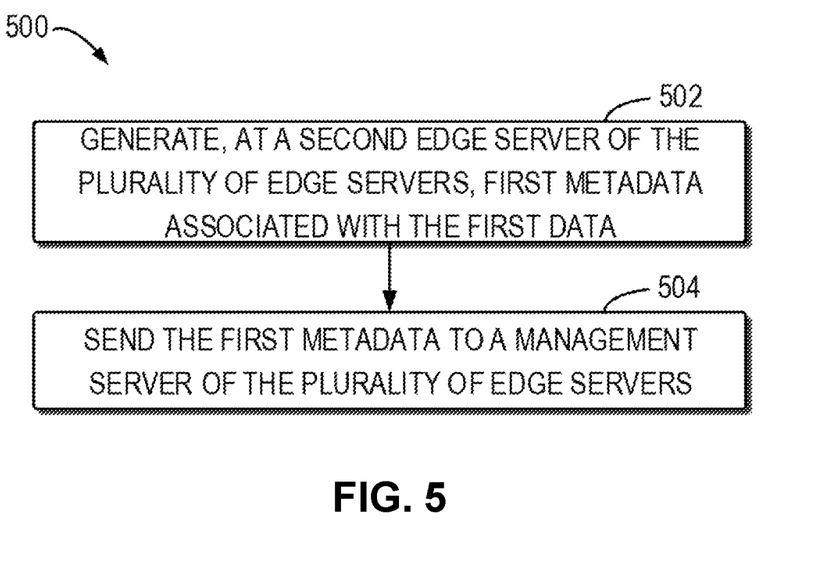
FIG. 5 illustrates a flow chart of an example method for storing data according to an embodiment of the present disclosure.

FIG. 5 illustrates a flow chart of an example method 500 for storing data according to an embodiment of the present disclosure. For example, the method 500 may be performed by the second edge server 220-2 shown in FIG. 2. The method 500 is described in detail below with reference to FIG. 2. It should be understood that the method 500 may also include additional actions not shown and/or omit the actions shown and the scope of the present disclosure is not limited in this regard.

At block 502, in accordance with a determination that the first data is stored in the first edge server 220-1 of the plurality of edge servers 220, the first metadata associated with the first data is generated at the second edge server 220-2 of the plurality of edge servers. The first metadata at least includes the first hash value of the first data and an indication that the first data is stored in the first edge server.

At block 504, the second edge server 220-2 sends the first metadata to the management server 210 of the plurality of edge servers 220, and the management server 210 is configured to maintain a metadata list associated with the data stored in the plurality of edge servers 220.

In some embodiments, the second edge server 220-2 may maintain a set of metadata corresponding to at least a portion of the data stored in the plurality of edge servers 220, and the set of metadata includes the first metadata, where sending the first metadata includes: determining, from the set of metadata, a subset of metadata including the first metadata, and the metadata in the subset of metadata has not been sent to the management server 210; and sending the subset of metadata to the management server 210.

In some embodiments, based on a storage rule obtained from the management server 210, the first data is stored in the first edge server 220-1.

In some embodiments, based on the storage rule, the first data is further sent from the first edge server to the cloud storage server 110, to cause the cloud storage server 110 to send the second metadata to the management server 210, the second metadata at least includes the first hash value of the first data and an indication that the first data is stored in the cloud storage server 110.

Figure 6:
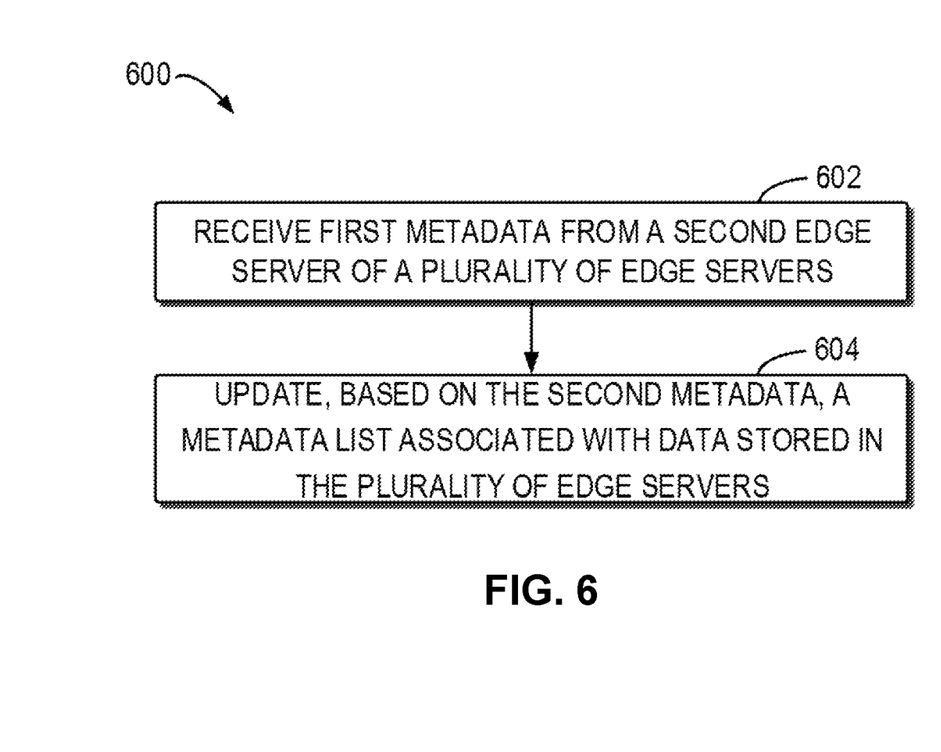
FIG. 6 illustrates a flow chart of an example method for storing data according to an embodiment of the present disclosure.

FIG. 6 illustrates a flow chart of an example method 600 for storing data according to an embodiment of the present disclosure. For example, the method 600 may be performed by the management server 210 as shown in FIG. 2. The method 600 is described in detail below with reference to FIG. 2. It should be understood that the method 600 may also include additional actions not shown and/or the actions shown may be omitted, and the scope of the present disclosure is not limited in this regard.

At block 602, at the management server 210, the first metadata is received from the second edge server 220-2 of the plurality of edge servers 220, and the first metadata is associated with the first data stored in the first edge server 220-1 of the plurality of edge servers 220 and the first metadata is generated by the second edge server 220-2. The first metadata at least includes the first hash value of the first data and an indication that the first data is stored in the first edge server 220-1.

At block 604, based on the first metadata, the management server 210 updates a metadata list associated with the data stored in the plurality of edge servers 220.

In some embodiments, the management server 210 may further add the third metadata to the metadata list in response to the second data being stored in the management server 210, and the third metadata at least includes the second hash value of the second data and an indication that the second data is stored in the management server 210.

In some embodiments, in response to receiving the second metadata from the cloud storage server 110, the management server 210 may further update the metadata list based on the second metadata, where the second metadata at least includes the first hash value of the first data and an indication that the first data is stored in the cloud storage server 110.

Figure 7:
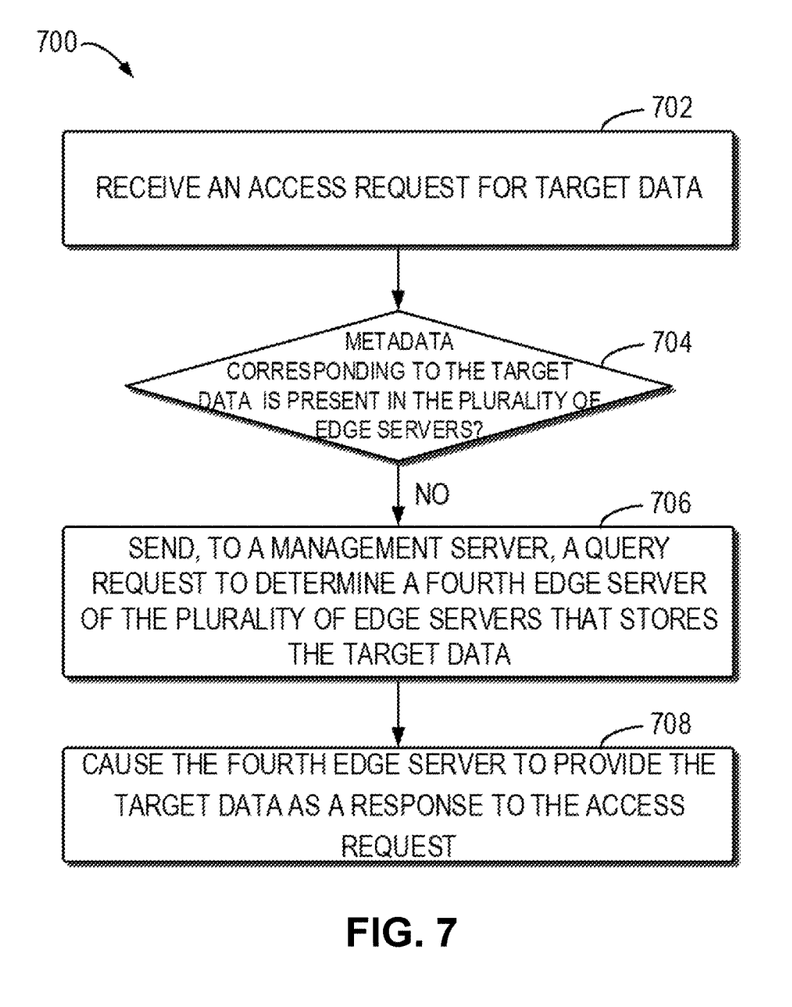
FIG. 7 illustrates a flow chart of an example method for accessing data according to an embodiment of the present disclosure.

FIG. 7 illustrates a flow chart of an example method 700 for storing data according to an embodiment of the present disclosure. For example, the method 700 may be performed by a third edge server 220-3 shown in FIG. 2. The method 700 is described in detail below with reference to FIG. 2. It should be understood that the method 700 may also include additional actions not shown and/or the actions shown may be omitted, and the scope of the present disclosure is not limited in this regard.

At block 702, the third edge server 220-3 receives an access request for target data.

At block 704, in response to the third edge server 220-3 of the plurality of edge servers 220 receiving the access request for the target data, based on the hash value of the target data, it is determined whether the metadata corresponding to the target data is present in the plurality of edge servers 220.

At block 706, in response to determining that metadata is absent from the plurality of edge servers 220, the third edge server 220-3 sends, based on the hash value, a query request to the management server to determine the fourth edge server 220-1 storing the target data in the plurality of edge servers 220.

At block 708, the third edge server 220-3 causes the fourth edge server 220-1 to provide the target data as a response to the access request.

Figure 8:
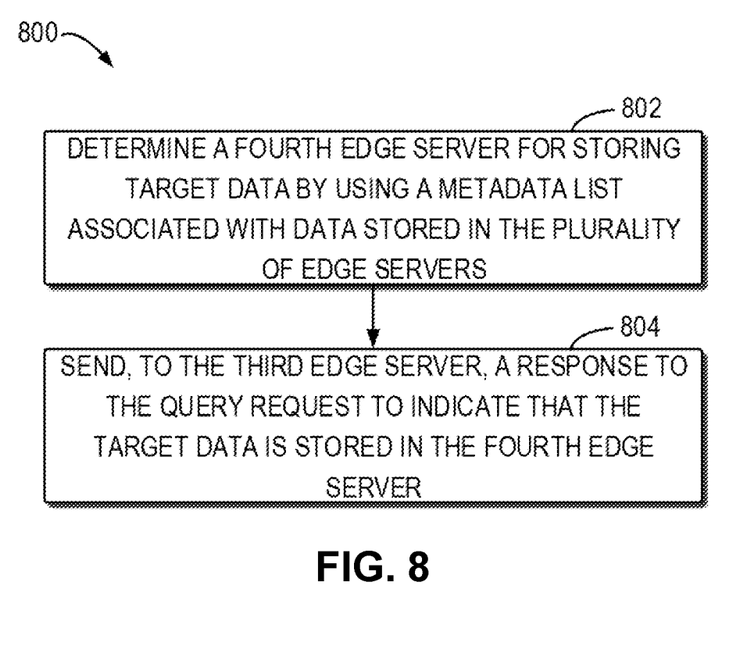
FIG. 8 illustrates a flow chart of an example method for accessing data according to an embodiment of the present disclosure.

FIG. 8 illustrates a flow chart of an example method 800 for storing data according to an embodiment of the present disclosure. For example, the method 800 may be performed by the management server 210 as shown in FIG. 2. The method 800 is described in detail below with reference to FIG. 2. It should be understood that the method 800 may also include additional actions not shown and/or the actions shown may be omitted, and the scope of the present disclosure is not limited in this regard.

At block 802, in response to receiving, at the management server 210, a query request from the third edge server 220-3 of the plurality of edge servers, the management server 210 utilizes the metadata list associated with the data stored in the plurality of edge servers 220 to determine the fourth edge server 220-1 that stores the target data, and a query request is generated based on the hash value of the metadata and is sent in response to the metadata corresponding to the target data being absent from the plurality of edge servers 220.

At block 804, the management server 210 sends a response to the query request to the third edge server 220-3 to indicate that the target data is stored in the fourth edge server 220-1.

Figure 9:
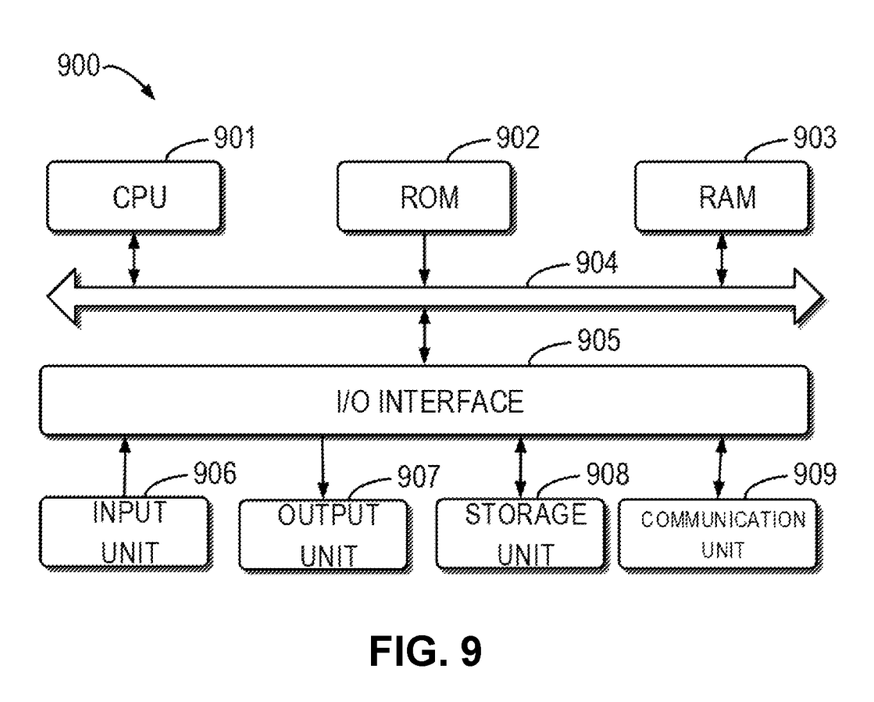
FIG. 9 illustrates a schematic block diagram of an example device for implementing embodiments of the present disclosure.

FIG. 9 illustrates a schematic block diagram of an example device 900 for implementing embodiments of the present disclosure. For example, a backup system and/or a recovery system according to an embodiment of the present disclosure may be implemented by the device 900.

As shown, the device 900 includes a central processing unit (CPU) 901, which may execute various suitable actions and processes based on the computer program instructions stored in a read-only memory (ROM) 902 or computer program instructions loaded in a random-access memory (RAM) 903 from a storage unit 908. The RAM 903 may also store all kinds of programs and data required by the operations of the device 900. The CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as a keyboard, a mouse and the like; an output unit 907, e.g., various kinds of displays and loudspeakers etc.; a storage unit 908, such as a magnetic disk and an optical disk etc.; and a communication unit 909, such as a network card, a modem, a wireless transceiver and the like. The communication unit 909 allows the device 900 to exchange information/data with other devices via a computer network, such as Internet, and/or various telecommunication networks.

The above described procedures and processes, such as one or more of the methods 500, 600, 700 and 800, may also be executed by the processing unit 901. For example, in some embodiments, one or more of the methods 500, 600, 700 and 800 may be implemented as a computer software program being tangibly included in a machine-readable medium, e.g., the storage unit 908. In some embodiments, the computer program may be partially or fully loaded and/or mounted to the device 900 via the ROM 902 and/or communication unit 909. When the computer program is loaded to RAM 903 and executed by the CPU 901, one or more steps of at least one of the above described methods 500, 600, 700 and 800 can be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible device that maintains and stores instructions utilized by the instruction executing devices. The computer-readable storage medium may be, but not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, RAM, ROM, an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include copper-transmitted cables, optical fiber transmission, wireless transmission, routers, firewalls, switches, network gate computers and/or edge servers. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, where the programming languages consist of object-oriented programming languages, e.g., Smalltalk, C++ and so on, and conventional procedural programming languages, such as "C" language or similar programming languages. The computer-readable program instructions can be implemented fully on a user computer, partially on the user computer, as an independent software package, partially on the user computer and partially on the remote computer, or completely on the remote computer or server. In the case where remote computer is involved, the remote computer may be connected to the user computer via any type of networks, including a local area network (LAN) and a wide area network (WAN), or to an external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described herein with reference to a flow chart and/or a block diagram of a method, a device (system) and a computer program product according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions, when executed by the processing unit of the computer or other programmable data processing apparatuses, generate a device for implementing functions/actions stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing devices or other devices, so as to execute a series of operation steps on the computer, other programmable data processing devices or other devices to generate a computer-implemented procedure. Therefore, the instructions executed on the computer, other programmable data processing devices or other devices implement functions/actions stipulated in one or more blocks of the flow chart and/or block diagram.

The flow charts and/or block diagrams in the drawings illustrate system architecture, functions and operations that may be implemented by a system, method and computer program product according to multiple implementations of the present disclosure. In this regard, each block in a flow chart and/or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, will be apparent to those skilled in the art. The selection of terms in the text aims to best explain principles and actual applications of each implementation and technical improvements made in the market by each embodiment, and to otherwise enable those of ordinary skill in the art to understand implementations of the present disclosure.

What is claimed is:

1. A method of storing data comprising:
in accordance with a determination that first data is stored in a first edge server of a plurality of edge servers, generating, at a second edge server of the plurality of edge servers, first metadata associated with the first data, the first metadata at least comprising a first hash value of the first data and an indication that the first data is stored in the first edge server; and
sending the first metadata to a management server of the plurality of edge servers, the management server being configured to maintain a metadata list associated with data stored in the plurality of edge servers, the metadata list being configured for storage of the first metadata and for storage of additional metadata comprising respective additional hash values of additional data and respective indications that the additional data is stored in respective other ones of the plurality of edge servers;

wherein the first data is stored in the first edge server based on a storage rule obtained from the management server; and wherein the first data is further sent, based on the storage rule, from the first edge server to a cloud storage server, to cause the cloud storage server to send second metadata to the management server, and wherein the second metadata at least comprises the first hash value of the first data and an indication that the first data is stored in the cloud storage server.

2. The method of claim 1, wherein the second edge server maintains a set of metadata corresponding to at least a portion of the data stored in the plurality of edge servers, the set of metadata comprising the first metadata, and wherein sending the first metadata comprises:

determining, from the set of metadata, a subset of metadata comprising the first metadata, wherein metadata in the subset of metadata has not been sent to the management server; and sending the subset of metadata to the management server.

3. A method of storing data, comprising:

receiving, at a management server, first metadata from a second edge server of a plurality of edge servers, the first metadata being associated with first data stored in a first edge server of the plurality of edge servers and being generated by the second edge server, the first metadata at least comprising a first hash value of the first data and an indication that the first data is stored in the first edge server;

updating, based on the first metadata, a metadata list associated with data stored in the plurality of edge servers, the metadata list being configured for storage of the first metadata and for storage of additional metadata comprising respective additional hash values of additional data and respective indications that the additional data is stored in respective other ones of the plurality of edge servers; and in response to receiving second metadata from a cloud storage server, updating the metadata list based on the second metadata, wherein the second metadata at least comprises the first hash value of the first data and an indication that the first data is stored in the cloud storage server.

4. The method of claim 3, further comprising:

in response to second data being stored in the management server, adding third metadata to the metadata list, wherein the third metadata at least comprises a second hash value of the second data and an indication that the second data is stored in the management server.

5. A method of accessing data, comprising:

in response to receiving, at a first edge server of a plurality of edge servers, an access request for target data, determining, based on a hash value of the target data, whether metadata corresponding to the target data is present in the plurality of edge servers;

in response to determining that the metadata is absent from the plurality of edge servers, sending, based on the hash value and to a management server, a query request to determine a second edge server of the plurality of edge servers that stores the target data, the second edge server of the plurality of edge servers being determined based in part on a metadata list, the metadata list being configured for storage of metadata that at least comprises a hash value of the target data and an indication that the target data is stored in the second edge server;

in response to receiving, at the management server, the query request from the first edge server of the plurality of edge servers, determining the second edge server for storing target data by using the metadata list, the query request being generated based on a hash value of the metadata and being sent in accordance with a determination that metadata corresponding to the target data is absent from the plurality of edge servers;

sending, to the first edge server, a response to the query request to indicate that the target data is stored in the second edge server; and causing the second edge server to provide the target data as a response to the access request.

6. An edge server for performing the method of claim 1, comprising:

at least one processing unit;

at least one memory coupled to the at least one processing unit and storing instructions for execution by the at least one processing unit, the instructions, when executed by the at least one processing unit, causing the edge server to perform the method of claim 1.

7. A management server for performing the method of claim 3, comprising:

at least one processing unit;

at least one memory coupled to the at least one processing unit and storing instructions for execution by the at least one processing unit, the instructions, when executed by the at least one processing unit, causing the management server to perform the method of claim 5.

8. An edge server for performing the method of claim 5, comprising:

at least one processing unit;

at least one memory coupled to the at least one processing unit and storing instructions for execution by the at least one processing unit, the instructions, when executed by the at least one processing unit, causing the edge server to perform the method of claim 5.

9. A computer program product being tangibly stored on a non-transitory computer-readable medium and comprising machine-executable instructions which, when executed by a device, cause the device to perform the method of claim 1.

10. A computer program product being tangibly stored on a non-transitory computer-readable medium and comprising machine-executable instructions which, when executed by a device, cause the device to perform the method of claim 3.

11. A computer program product being tangibly stored on a non-transitory computer-readable medium and comprising machine-executable instructions which, when executed by a device, cause the device to perform the method of claim 5.

12. The method of claim 5, wherein causing the second edge server to provide the target data as a response to the access request comprises:

in response to determining that the target data is stored in the second edge server, the first edge server forwards the access request to the second edge server; and in response to receiving the access request, the second edge server provides the target data to a client device.

13. The method of claim 3, wherein the indication that the first data is stored in the first edge server comprises an identity of the first edge server.

14. The method of claim 1, wherein the indication that the first data is stored in the first edge server comprises an identity of the first edge server.

15. The computer program product of claim 11, wherein causing the second edge server to provide the target data as a response to the access request comprises:

in response to determining that the target data is stored in the second edge server, the first edge server forwards the access request to the second edge server; and in response to receiving the access request, the second edge server provides the target data to a client device.

16. The computer program product of claim 10, wherein the machine-executable instructions which, when executed by the device, further cause the device to perform the method of:

in response to second data being stored in the management server, adding third metadata to the metadata list, wherein the third metadata at least comprises a second hash value of the second data and an indication that the second data is stored in the management server.

17. The computer program product of claim 9, wherein the second edge server maintains a set of metadata corresponding to at least a portion of the data stored in the plurality of edge servers, the set of metadata comprising the first metadata, and wherein sending the first metadata comprises:

determining, from the set of metadata, a subset of metadata comprising the first metadata, wherein metadata in the subset of metadata has not been sent to the management server; and sending the subset of metadata to the management server.

18. The edge server of claim 8, wherein causing the second edge server to provide the target data as a response to the access request comprises:

in response to determining that the target data is stored in the second edge server, the first edge server forwards the access request to the second edge server; and in response to receiving the access request, the second edge server provides the target data to a client device.

19. The management server of claim 7, wherein the instructions, when executed by the at least one processing unit, further cause the management server to perform the method of:

in response to second data being stored in the management server, adding third metadata to the metadata list, wherein the third metadata at least comprises a second hash value of the second data and an indication that the second data is stored in the management server.

20. The edge server of claim 6, wherein the second edge server maintains a set of metadata corresponding to at least a portion of the data stored in the plurality of edge servers, the set of metadata comprising the first metadata, and wherein sending the first metadata comprises:

determining, from the set of metadata, a subset of metadata comprising the first metadata, wherein metadata in the subset of metadata has not been sent to the management server; and sending the subset of metadata to the management server.

* * * * *